Jan. 27, 1953  W. D. FORTUNE  2,626,561

COOKSTOVE

Filed July 11, 1950

INVENTOR.
WILLIAM D. FORTUNE
BY
McMorrow, Berman + Davidson
ATTORNEYS

Patented Jan. 27, 1953

2,626,561

UNITED STATES PATENT OFFICE 2,626,561

COOKSTOVE

William Delvin Fortune, De Witt, Ark.

Application July 11, 1950, Serial No. 173,106

3 Claims. (Cl. 99—447)

This invention relates to cook stoves and more particularly to a stove for broiling and barbecuing meat and simultaneously cooking a sauce for the meat.

It is among the objects of the invention to provide an improved cook stove of simplified construction for broiling or barbecuing meat over a fire and simultaneously cooking a sauce for the meat, which cooks the meat evenly without scorching or burning and flavors the meat with the sauce during the cooking process, which operates with a high economy of fuel, which comprises a minimum number of simple and readily separable parts including a fire box, a sauce pan mountable on the fire box, an oven mountable on the sauce pan and a grille mountable on the sauce pan within the oven, which is of light weight construction and easily movable from place to place, and which is strong and durable in construction, economical to manufacture, and neat and attractive in appearance.

Other objects and advantages will become apparent from a consideration of the following description and the appended claims in conjunction with the accompanying drawings wherein:

Figure 1:
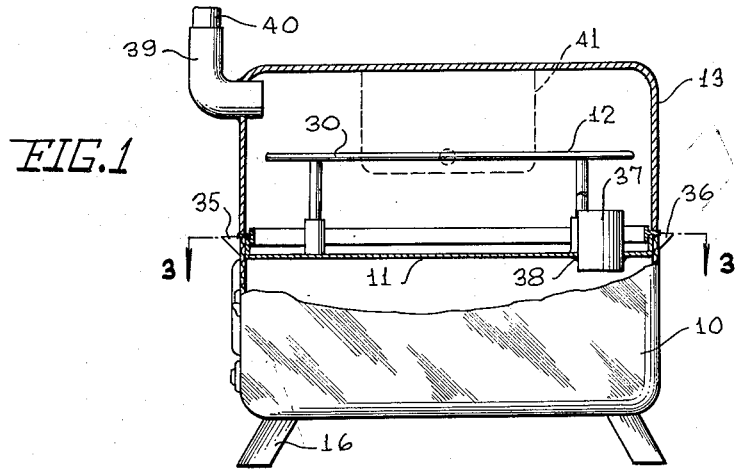
Figure 1 is a side elevational view of a cook stove illustrative of the invention, a portion being broken away and shown in cross section to better illustrate the construction thereof.
Figures 2, 4:
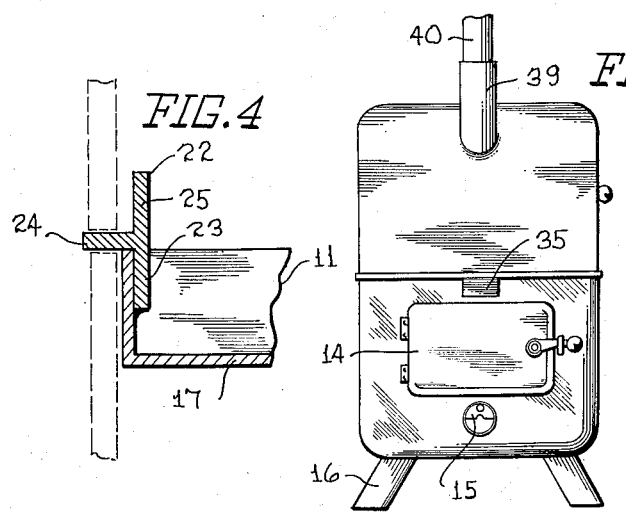
Figure 2 is an end elevation of the cook stove looking at the left hand end of the stove as illustrated in Figure 1.
Figure 4 is a fragmentary cross sectional view on an enlarged scale on the line 4—4 of Figure 3.
Figure 5:
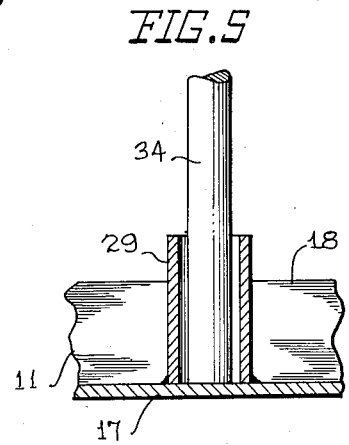
Figure 5 is a fragmentary cross sectional view on an enlarged scale on the line 5—5 of Figure 3.
Figure 3:
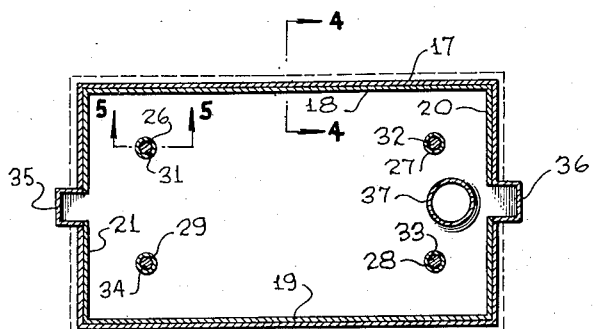
Figure 3 is a cross sectional view on the line 3—3 of Figure 1.

With continued reference to the drawing, the stove comprises a hollow, rectangular fire box 10 having an opened top, a shallow sauce pan 11 disposed within the open top of the fire box and marginally supported on the edge of the fire box at the open end thereof, a grille 12 supported on the pan and spaced thereabove and a hollow oven 13 of rectangular shape having an open bottom and supported at its bottom edge of the pan 11 marginally of the pan.

The fire box 10 may be conveniently provided from a suitable material, such as sheet iron, and, as illustrated, has a length greater than its width and a height slightly less than its width. At one end the first box is provided with an opening closed by a fire door 14 hinged to the box at one side of the opening, and is provided with a second opening controlled by a draft damper 15. If desired, a suitable grate may be placed in the fire box for supporting fuel, such as charcoal, for combustion and the fire box may be supported on legs 16 projecting from its bottom, one at each corner thereof.

The sauce pan 11 is a rectangular structure having a bottom wall 17, two side walls 18 and 19 and two end walls 20 and 21. It has been found that a pan having a depth of approximately three inches provides excellent results in use, the length and width of the pan being proportioned to the size of the pieces of meat which it is desired to cook in the stove.

A rim 22 extends around the upper, open side of the pan 11 and comprises lengths of structural iron of T-shaped cross section. Each length of such iron is disposed so that one side 23 of its cross portion is disposed within the pan and secured thereto by suitable means, such as welding, and its stem portion 24 projects outwardly of the pan over the top edge of the latter. The other half 25 of the cross portion projects upwardly from the pan and the lengths of structural iron are disposed one along each side of the pan. This provides a construction wherein the stem 24 of the iron provides an outwardly extending bead for supporting the pan on the top edge of the fire box with the pan disposed within the fire box at the top thereof and the cross portion 25 constitutes a flange extending around the pan and projecting upwardly therefrom at the inner side of the fire box walls.

The pan 11 may also be formed of a suitable material, such as sheet iron or sheet steel, and is preferably formed of a corrosion resisting metal or alloy.

Four tubular sockets 26, 27, 28 and 29 are secured each at one end to the bottom wall 17 of the pan 11 at the side of this bottom wall adjacent the open top of the pan and these sockets are disposed one near each corner of the pan.

The grille 12 comprises a flat perforate structure 30 of rectangular shape, somewhat smaller than the pan, and four legs as designated at 31, 32, 33 and 34 each secured at one end to the grille plate 30 one near each corner of the latter and projecting substantially perpendicularly from the same side of the grille plate. The ends of these legs 31, 32, 33 and 34 remote from the grille plate are received in the sockets 26, 27, 28 and 29 respectively.

The end walls of the pan are provided with outwardly projecting extensions 35 and 36 respectively and the portions of the band 22 extending across the ends of the pan are discontinuous at the location of the extensions 35 and 36. These extensions 35 and 36 project outwardly of the end walls of the fire box, as is clearly illustrated in Figure 1, and provide filler spouts or funnels for pouring liquids into the pan.

A flue 37, in the form of a short length of cylindrical pipe or tubing extends through an aperture in the bottom wall 17 of the pan near the extension 36 and is welded to the pan around the opening therein, as indicated at 38. This flue extends slightly above the plane of the top edges of the band 22 and provides a passage for conducting the products of combustion from the interior of the fire box 10 through the pan and to the space immediately above the pan and below the grille plate 30.

The oven 13 is a hollow, rectangular body of substantially the same size as the fire box 10 and has an open bottom. The bottom edges of the oven rest on the top surface of the bead 24 the lower surface of which rests on the top edge of the fire box and the oven completely encloses the grille 12, the pan 11 and the flue 37.

An elbow stack 39 projects upwardly from one end of the oven at a location above the grille plate 30 and may be extended upwardly by pipe sections, as indicated at 40, if desired. The oven is also provided with a door 41 which preferably extends through a portion of one of the side walls and a portion of the top wall of the oven.

With the above described arrangement, a suitable sauce may be placed in the pan 11, a fire started in the fire box and meat to be broiled or barbecued placed on the grille plate 30. The heat of the fire will cook the sauce in the pan 11 and the products of combustion will pass through the flue 37 to the meat on the grille plate and cook the meat, these products of combustion finally escaping through the stack elbow 39. The evaporation of the sauce will maintain the meat moist and prevent burning or scorching and will also flavor the meat with the sauce while the meat is being cooked. Water can be added to the pan as necessary through the filler spouts 35 and 36 and fuel can be added through the fire door as required.

By omitting the legs 16 and making the oven 13 slightly larger than the fire box 10, the fire box can be nested in the oven and the pan and grille placed in the fire box to reduce the stove to a compact condition for convenient storage or transportation. The same result could also be obtained by making the oven slightly smaller than the fire box.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cook stove comprising a fire box having an open top, a shallow pan marginally supported at the open top of the latter, a draft tube extending through said pan and providing a draft passage communicating with the interior of said fire box and with the space above said pan, a grille supported on said pan and spaced thereabove, an oven having an open bottom supported at its bottom edge on said pan marginally of the latter and enclosing said pan and said grille, sockets secured on said pan one near each corner thereof, and legs depending from said grille and respectively received in said sockets.

2. A cook stove comprising a fire box having an open top, a shallow pan marginally supported at the open top of the latter, a draft tube extending through said pan and providing a draft passage communicating with the interior of said fire box and with the space above said pan, a grille supported on said pan and spaced thereabove, an oven having an open bottom supported at its bottom edge on said pan marginally of the latter and enclosing said pan and said grille, sockets secured on said pan one near each corner thereof, legs depending from said grille and respectively received in said sockets, and a smoke stack secured in an aperture in said oven and projecting from the latter.

3. A cook stove comprising a fire box having an open top, a shallow pan marginally supported at the open top of the latter, a draft tube extending through said pan and providing a draft passage communicating with the interior of said fire box and with the space above said pan, a grille supported on said pan and spaced thereabove, and an oven having an open bottom supported at its bottom edge on said pan marginally of the latter and enclosing said pan and said grille, said pan having around its top a band comprising lengths of structural iron of T shaped cross section disposed one along each side and each end wall of the pan with one part of the cross portion of each length disposed against and secured to the inner side of the corresponding wall, the other part of the cross portion extending upwardly from the band to provide an oven locating flange, and the stem portion extending outwardly of the pan to provide a supporting bead resting on the top edge of the fire box and receiving the bottom edge of the oven.

WILLIAM DELVIN FORTUNE.

REFERENCES CITED

The following references are of record in the file of this patent:

UNITED STATES PATENTS

| Number | Name | Date |
| --- | --- | --- |
| 317,219 | Seavey | May 5, 1885 |
| 1,051,503 | Klien | Jan. 28, 1913 |
| 1,422,835 | Condy | July 18, 1922 |
| 1,802,005 | Detwiler | Apr. 21, 1931 |
| 1,837,924 | Rutherford | Dec. 22, 1931 |
| 1,964,372 | Tygart | June 26, 1934 |
| 2,377,873 | Finizie | June 12, 1945 |
| 2,429,282 | Van Ness | Oct. 21, 1947 |
| 2,458,233 | Wemyss | Jan. 4, 1949 |
| 2,556,808 | Harris | June 12, 1951 |
| 2,568,022 | Parker | Sept. 18, 1951 |

FOREIGN PATENTS

| Number | Country | Date |
| --- | --- | --- |
| 27,813 | Austria | Mar. 11, 1907 |
| 521,256 | Great Britain | May 16, 1940 |